June 14, 1955   R. W. GRISWOLD II, ET AL   2,710,649
COMBINATION SHOULDER AND LAP SAFETY BELTS
Filed Feb. 19, 1951   2 Sheets-Sheet 1
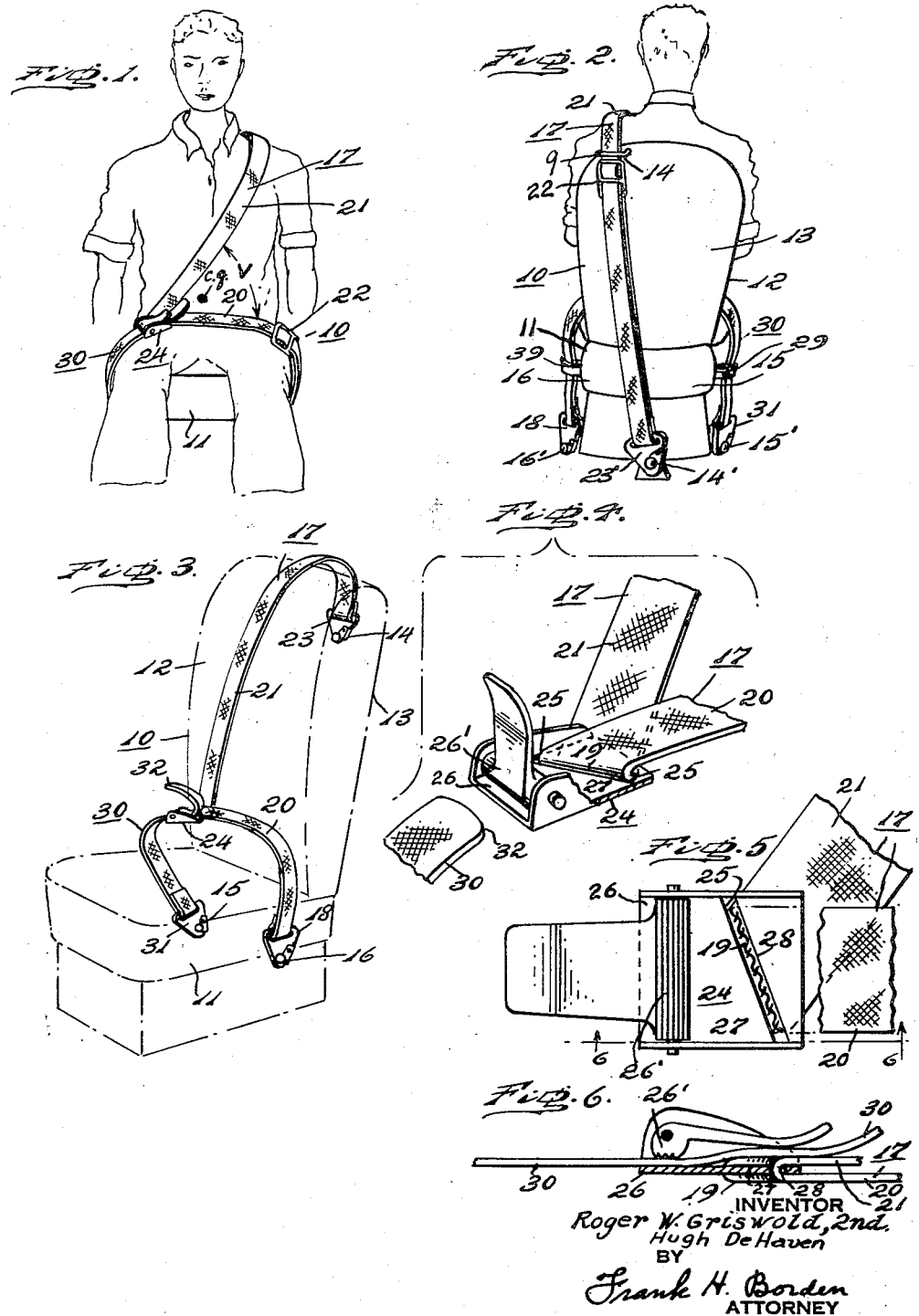
INVENTOR
Roger W. Griswold, 2nd.
Hugh DeHaven
BY
Frank H. Borden
ATTORNEY

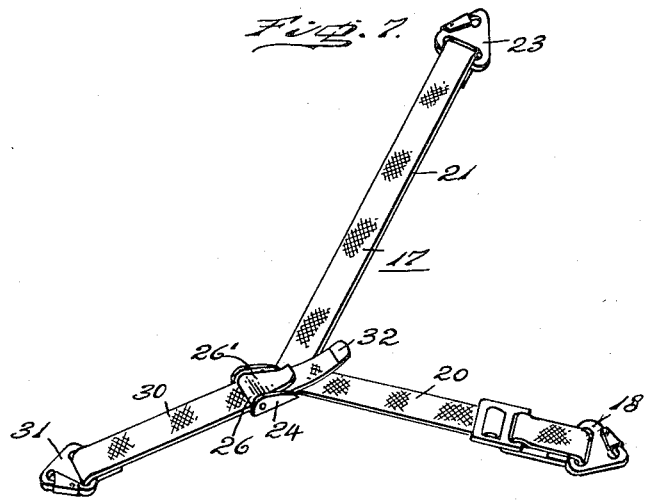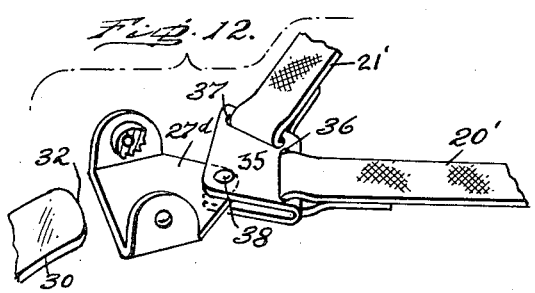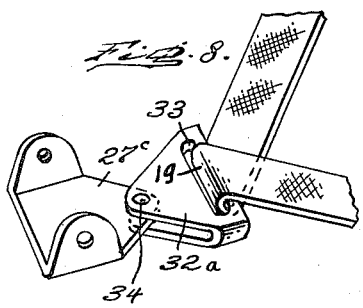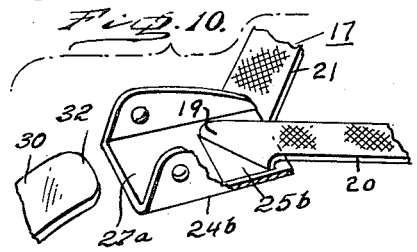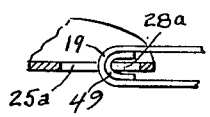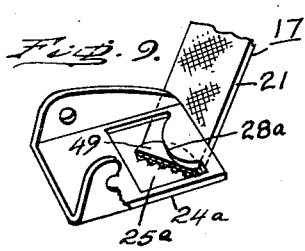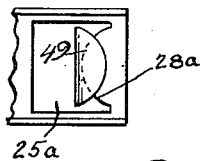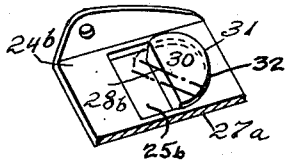

United States Patent Office

2,710,649
Patented June 14, 1955

2,710,649

COMBINATION SHOULDER AND LAP SAFETY BELTS

Roger W. Griswold II, Old Lyme, and Hugh De Haven, Lyme, Conn., assignors to Elizabeth M. Griswold, doing business as Griswold Company, Old Lyme, Conn.

Application February 19, 1951, Serial No. 211,738

8 Claims. (Cl. 155—189)

This invention relates to combined shoulder and lap safety belts, for the dual restraint of occupants of seats. While being broadly applicable to any restraint functions including dentist chairs, operating tables, litters, and the like, it pertains specifically to the restraint of occupants of seats such as those of vehicles in which due to sudden accelerations the occupants are subject to forces toward propulsion from the seats. For purposes of illustration it will be assumed that the invention is applied to the seats of aircraft, to prevent or at least minimize the hazards attaching to violent maneuvers or accidents such as collisions and crashes in which the seat occupant is exposed to varying degrees of high accelerations relative to the seat itself.

It has become commonplace in aircraft, military tanks, certain types or uses of automobiles and the like, to provide some sort of restraint for the seat occupants. Since the early days of flying this has taken the form of a seat or lap belt, with a quick release fitting. While this method for partial body restraint has been effective for certain types of relatively minor accelerations of the occupants arising from rough air, voluntary maneuvers, etc., it has proved to be woefully deficient with the higher accelerations experienced in many of the more serious types of accidents. This known ineffectiveness arises from the fact that such lap or seat belts of themselves cannot and do not prevent the generally forward movement of the upper torso and head of the occupant. In response to such dangerous high accelerations, the head of the occupant is thrown forward to impact with the relatively stationary instrument panel, control wheel or other element constituting a potentially lethal instrument or component, with frequently fatal or dangerous results.

With progress of "crash injury" research, the necessity for some better form of protection for the occupant which will preclude the shocking impacts of the head and upper torso on relatively stationary portions of the vehicle, has been amply established. As an attempted answer to the problem, many forms of separate shoulder harness have been evolved as an augmentation of the partial restraint available from the lap or seat belt, but as provided hitherto they have been possessed of such disadvantageous features as to fail to find the ready acceptance and universal use that theoretically at least should follow the mere pointing out of the dangerous inadequacies of the conventional lap or seat belt. Research indicates that in numerous instances even where such shoulder harnesses have been provided and have been available to the occupants of an aircraft having a fatal crash (for instance) the shoulder harness was not even buckled or attached to the occupant. Part of the blame for this condition lies in the defects of the shoulder harness per se militating against its use as a matter of course, and part no doubt because familiarity breeds contempt and the occupant frequently prefers to wait until the imminence of danger (if he be aware of such) causes a hurried attempt to attach the shoulder harness, which, owing to the time factor, may not be possible before the accident occurs. As a solution to the separate shoulder harness, efforts have been made to combine in a single organization the restraint function of the seat belt with the completely separate restraint function of the shoulder harness.

The major difficulty lies in the false premise that the shoulder harness should be provided as an auxiliary assembly of straps to be built upon or attached to the existing safety seat belt. At any rate, as previously provided, the efforts toward combinations of shoulder and seat harness have taken the form of a multiplicity of straps and a plurality of individual more or less complicated fittings, which are compounded upon the quick release equipped seat belt with its fittings, all of which involves high cost. This concept, which requires the occupant to organize the combination, permits discretion on his part as to whether or not the shoulder harness portion of the assembly is or is not properly assembled over his torso. The shoulder harness as previously provided is either uncomfortable and exerts such constant constricting restraint of the occupant as to cause him to be continuously and uncomfortably aware that the shoulder harness is properly coupled or, if loose enough for comfort, is so loose as to fail in its restraining function, and therefore the normal reaction is a decision to leave it uncoupled. While elaborate efforts have been made to secure looseness with restraint, when needed, by inertia devices and the like, which tighten or become anchored under accelerations, they are cumbersome, expensive, not completely satisfactory to the user and still permit discretion as to attachment or detachment of the shoulder harness portions.

The conventional seat belt provides two strap elements which are joined together by a suitable buckle or like fitting to accomplish its single restraint function. The typical shoulder harness provides at least one and usually a plurality of straps or strap elements to accomplish its distinctly separate restraint function. Combinations of the two restraint functions to simultaneously possess both restraint functions involves a multiplicity of straps and successive coupling and uncoupling functions to render the complete assembly operative. As noted, these combinations permit buckling of the seat belt without buckling the shoulder harness.

Whatever the reasons underlying the difficulties in attaining universal adoption and use of the shoulder harness in addition to the seat safety belt, as such combinations have previously been provided, the inadequacies of the prior art obviously pose a problem which has not hitherto been satisfactorily resolved. As noted, the shoulder harness is uncomfortable, unduly constricting, is inconvenient to dispose of when not in use, is inconvenient to properly assemble, couple, and attach, involves multiple straps and points of attachment, and as a consequence has failed of universal adoption, and from the standpoint of market acceptance is unsatisfactory.

It is among the objects of this invention to provide both lap or seat belt and shoulder strap protection by means of an effectively integral restraint device comprising essentially only two strap elements; to provide a seat belt-shoulder strap combination wherein the dual functions are non-elective by the operator, that is, wherein the device inherently requires operative attachment of the shoulder harness and the seat belt across the torso in synchronism; to provide a combined shoulder and lap or seat harness which is easy and convenient in use, thus enhancing assurance of actual use in practice (in contradistinction to disinclination to use conventional shoulder harness); to provide such a combination which is comfortable to the user in either a "tight" or "loose" condition of adjustment; to provide such a combination with securing and adjusting means operable quickly and conveniently without any especially careful attention or mechanical aptitude on the part of the user; to provide such a combination having a single quick release buckle; to improve the fittings of combined shoulder-lap safety belts; to provide such a combination characterized by simplified design and thus low manufacturing cost; to provide such a combination which is particularly adaptable for use by women because it does not apply high impact pressures against the breast.

Other objects and advantages will become more apparent as the description proceeds.

In the accompanying drawings:

Fig. 1 represents a front elevation of a portion of a seat with an occupant to be restrained thereon shown in a seated posture, with the combined lap and shoulder harness of this invention in operative assembly relative to the seat and occupant so as to exert both lap and shoulder restraint functions, in an illustrative embodiment.

Fig. 2 represents a rear elevation of the seat and occupant of Fig. 1, in one illustrative embodiment, with elongated straps secured to the anchoring attachments beneath the seat with the elongated strap elements passing across "effective" anchoring points on the seat.

Fig. 3 represents in phantom (broken lines) both a perspective of the seat with a shorter form of the combined lap and shoulder harness of the invention in its operative restraining assembly in full lines, with the occupant removed, and showing the three terminal ends of the straps secured to actual anchoring points on the seat.

Fig. 4 represents a fragmentary exploded perspective of an illustrative form of a common quick release buckle and slide fitting for the longer strap element, with the shorter strap element end about to enter the quick release buckle portion to complete the operative assembly shown in Figs. 1 and 3.

Fig. 5 represents a plan of the illustrative combination fitting of Fig. 4, with the folded longer strap shown in fragmentary form in an inclined or biased slot in the fitting.

Fig. 6 represents a longitudinal section on line 6—6 of Fig. 5 showing broadly the assembly of strap and fitting to form the invention in its operative assembled restraining position of Figs. 1 and 3.

Fig. 7 represents a perspective of the combined lap and shoulder harness as an operative assembly aside from the actual anchoring attachments therefor, showing broadly the geometry of the assembly.

Fig. 8 represents a fragmentary perspective of a modified form of combined quick release buckle and long strap fitting, in which the biased slot becomes biased by reason of a pivotal relation of the parts, with the quick release element removed for clarity.

Fig. 9 represents a perspective of a still further modified form of combined quick release buckle and long strap fitting, in which the angular relation of the lap and shoulder courses is established by a curved guide edge with a strap-supporting rocker plate effectively pivotal thereon, the quick release element being removed for clarity.

Fig. 10 represents a fragmentary exploded perspective of the long strap passing about the generally linear portion of an arcuate swivel fitting with the end of the short strap in position for threading attachment to the quick release portion, which is removed for clarity.

Fig. 11 represents a fragmentary plan of the swivel portion of the fitting of Fig. 10.

Fig. 12 represents a fragmentary perspective of a modified form of common quick release buckle and long strap attachment in which an illustratively pivoted member is provided for anchored attachment of the shoulder and lap portions of the assembly with the clamping portion of the quick release buckle removed for clarity.

Figs. 13 and 14 represent fragmentary details of the device of Fig. 9.

For illustrative purposes assume a seat 10 in a given vehicle or the like, such as the illustrative aircraft noted. The seat comprises a generally horizontal seat portion 11 suitably supported upon and above the floor of the aircraft, and a generally vertical back portion 12. The seat 10 may take any form, be provided with arm rests or the like, and be otherwise equipped for the comfort of the occupant. The back portion 12 of the seat 10 has a rear surface 13. Suitable "effective" points of attachment are provided on or relative to the seat, as follows: point 14 on the rear surface 13 of the back toward the upper end thereof, which may be generally centered thereon, if desired, and which may comprise an anchored ring or pin to which a strap end can be connected or a guide clip 9 through which passes the strap 17 to be described; point 15, comprising the same sort of fitting connector on one side of the seat portion 11 or a guide clip 29 through which short strap 30, to be described, passes; and a point 16 on the other side of the seat portion 11 or a guide clip 39 through which strap 17, to be described, passes. As will be pointed out, these are either actual or "effective" points of attachment, as the actual ultimate anchoring points for the straps to be described may be a single common ring fitting, or a plurality of individual anchorage fittings on the floor of the aircraft, spaced from the seat itself, as indicated at 14', 15', and 16' of Fig. 2. If preferred, each anchorage may be a fitting mounted on a portion of the fuselage or other primary structure other than the seat itself, to carry the loads. As, however, the straps to be described pass substantially to or across these respective points, either to anchorage thereat, as shown in Fig. 3, or in extension beyond same for ultimate anchorage spaced therefrom, as shown in Fig. 2, the term "effective" is used to cover either situation. This is because the effective points of anchorage are those relative to which the straps are relatively or substantially fixed in tension and are those points to, through, or across which loads are transmitted.

A more or less elongated strap 17 is provided, having a lower fitting 18 at one end for anchorage at the effective point 16, either directly, as in Fig. 3, or indirectly by attachment to the fitting 16' of Fig. 2. This strap at its opposite end is provided with the anchorage fitting 23 for attachment to the effective fitting 14, either directly as in Fig. 3, or indirectly by means of the anchorage fitting 14' of Fig. 2. Strap 17 is divided by the common fitting 24, to be described, into the lower lap course 20, and the upper shoulder course 21. Suitable take-up or adjustments may be provided to enhance fitting of various sizes of seat occupants, by looping one end of the strap 17, relative either to the fitting 23 or 18, by a slidable adjusting fitting, comprising the fitting 22 of Fig. 1 and Fig. 2. In some cases it may be satisfactory to make all necessary adjustments in the mere operative assembly of the parts, as shown in Fig. 3, in which situations no take-up for strap lengths need be provided. The preferred form of the long strap as just described is of a strap continuous between the free, ultimately anchored ends, part of which strap is a lap or seat strap 20, and part of which is a shoulder strap 21. The lap or seat strap portion of the assembly is completed by the relatively short strap 30, having one terminal end provided with an anchoring attachment or fitting 31, for engagement at the effective anchoring point 15, on the opposite side of the seat portion 11 from the effective anchoring point 16, either directly as in Fig. 3 or by prolongation and anchoring to the point 15' as in Fig. 2. The free end of the short strap 30 is suitably clipped or terminated as at 32, as to thread through the quick release of the common fitting 24, to be described. The material used for straps 17 and 30 is pliant, flexible, non-rigid, stretchable within acceptable limits, and is sufficiently soft as to readily conform to body contours and distortions thereof under high acceleration loads, with minimal risk of ruptures, lacerations, abrasions and the like. A typical preferred material which possesses the desired characteristics, and is probably the best material so far developed is high tensile strength woven textile webbing as generally used in the safety belt and shoulder harness art. Any deviations from this specific type of material should at least equal the stated qualifications of such webbing in all respects. Webbing and any other material meeting or exceeding these respective qualifications is included by the term "webbing" as used herein.

A special common fitting 24 is provided, the essentials of which are some means for establishing length-adjusting quick-release interengagement between the common fitting and the short strap 30, and means establishing loop engagement with and at the juncture of the lap and shoulder courses 20 and 21 respectively of the long strap. In a purely illustrative form, the fitting 24 comprises a plate or like portion 27 with a transverse inclined or inclinable loop-restraining element 28, toward the end of the plate opposite to the line at attachment of the short strap 30, by which the fold 19 in long strap 17, forming the mergence of the lap and shoulder courses 20 and 21 is engaged slidably adjustably and angularly so that relative sliding of the strap 17 and of common fitting 24 is provided. Such adjustment or relative sliding is preferred, although, as will be later pointed out, the adjustments, once made, can be fixed with regard to the common fitting 24. The plate 27 at the opposite end from the restraining edge or like surface 28 is provided with any desired form of quick release clamping or other attaching device 26, having a movable, pivotal cam, clamping portion 26'. The only requisite of the quick release device be that it permit the threading or like insertion of the free end 32 of the short strap 30 therethrough, to such degree of entry as to tighten the lap course 20, and the short strap 30 simultaneously to form an effectively continuous lap belt, as in conventional seat belt assemblies, as well as tightening the shoulder course 21, while continuously maintaining effective clamping action in use, and quick release in emergencies. The threading and desired tightening of the continuous lap belt is followed by manipulation of the movable portion 26' to clamp the short strap 30 to the fitting 24 in the desired tightened position of adjustment. The details of the quick release portions of the common fitting are not of themselves of importance. In the illustrative case, the pivoted cam portion 26' clamps the fabric of strap 30 against the adjacent inner face 26 of plate 27 of the buckle with a quick release which overcomes dead center clamping in which the tension on the short strap 30 tends to maintain the movable portion in clamping position. However, this is purely illustrative and not limitative and any one of the great number of these devices previously developed, or which may be developed in the art of quick release safety belts can be used to receive and releasably engage strap 30 to the common fitting 24. What is important in the assembly, however, is the provision of any broadly designated quick release buckle as a part of or attached operatively to the common fitting which also engages the long strap and defines the fold therein dividing the strap into the two courses 20 and 21 previously noted.

It will be apparent that the fitting 24 may have any sort of bearing restraining edge about which the fold 19 of long strap 17 can turn. While not ignoring the possibility of having such restraining edge as substantially normal to the length of the short strap in assembly, it will be seen that although the lap course 20 of the long strap 17 if aligned with short strap 30 could pass smoothly over the lap of the occupant of the seat to and about such normal edge, the transition of the shoulder strap through the common fitting and into the shoulder course 21 would be accompanied by twisting and bulging of the strap 17, adjacent to the fitting 24. In the usual case this would be undesirable. It is preferred to provide the fitting 24 with a cocked or biased, or floatingly biasable restraining edge 28 for engaging the inner surface of the loop or fold 19 of strap 17, formed by the mergence of the lap course 20 and shoulder course 21. The bias or slant of the edge 28 is at such an angle to the general line of the short strap 30 in assembly as to compromise or accommodate the relatively divergent directions of the respective courses of the long strap 17. While the normal line to edge 28 always bisects the angle formed by courses 20 and 21, if no ulterior distortion exists, such normal line will not be coincident with short strap 30, when an inclined edge 28 is used. The reason for this unsymmetrical configuration is to align short strap 30 with the off-center resultant force from courses 20 and 21 due to customary unequal loadings caried by these straps. In other words, a compromise or accommodation in angle of inclination of the edge surface 28 between that which is exactly normal to the lap course 20 and that which is exactly normal to the shoulder course 21. In the preferred and simplified form shown in Figs. 4, 5, and 6, the inclined edge 28 forms one boundary of a slot 25 or other opening within the plate 27, with the edge 28 extending linearly on a line angularly divergent from the normal to the long axis of the fitting 24. The opening 25 permits the strap 17 to be threaded therethrough so as to attach the fitting to the long strap on a self-adjusting basis as the short strap 30 is tightened in the common fitting. In such self-adjustment, the fold 19 progressively shifts as the lap and shoulder courses relatively adjust to the tension of the short strap 30 and the dimensions of the seat occupant.

It will be clear that the opening 25 through which the long strap is threaded in the preliminary assembly of the device does not need to be a slot or slit, and the edge 28 does not need to have a fixed bias relative to the plate 27. As shown, in Fig. 9, the opening 25a in common fitting 24a has one surface formed by a symmetrically curved or generally arcuate edge 28a, in cooperation with a guide clip 49 to maintain fold 19 with reference to which the strap 17 may find its own angle in forming the loop or fold 19. As shown in Figs. 10 and 11, the opening 25b may have the fold-engaging portion formed of a self-seating adjustable element 30 having a generally linear edge 28b leading into an arcuate guide surface 31 mounted slidably in an arcuate guide 32 in the plate 27a of the common fitting 24b. As shown in Fig. 8, the plate 27c may mount a pivoted plate 32a having the linear slot 33, and connected to the common fitting by a suitable pivot pin or the like 34. It will be observed that in Fig. 9 the common fitting is self-seating as far as the long strap 17 is concerned, by simply adjusting itself on the curve 28a, while in Figs. 8 and 11 the self-seating is a function of a generally pivotal movement.

It has been mentioned that in the preferred form the long strap is slidable relative to the common fitting. As this is for easy compromise adjustment of the lap and shoulder courses, it will be seen that after the proper ratio between these courses has been established for balanced resolution of the forces involved there need not be any necessity for adjustment of the common fitting on or relative to the strap 17. It is contemplated, if desired, that interlocking devices may be mounted on the common fitting 24 to anchor the long strap against sliding movement on fitting 24. Alternatively, as shown in Fig. 12, it is contemplated that this result, when desired, can be accomplished in another manner. In this form of the device, a lap course 20' is a separate strap from the shoulder course 21', except as they actually are continuous effectively integral straps by connection to a common integral unit 35. This is a device having slots 36 and 37 to receive the anchored ends of straps 20' and 21' respectively, pivoted at 38 to the common fitting plate 27d. Obviously, length adjustment means may be provided in either 20' or 21' as may be required.

Obviously the tension in any given webbing strap balances the resultant of the tension loads carried by the effective other two webbing straps. Insofar as the respective three resultant forces are not symmetrically disposed between the effective two webbing straps establishing any given resultant, as will be the case in the usual installation, the common fitting 24 must necessarily be cooperatively asymmetrical or skewed relative to the straps so that the loads will be evenly carried by the latter without substantial distortion or "crowding" at one edge of any strap at its effective attachment line. This is secured by the cocked or biased restraining edge 28 and its related surfaces for the fold line 19.

It will also be obvious that between seat occupants of different size, or between relative length adjustments which may be made, either of which will determine or establish the geometry of any instant assembly, i. e., the angular relation of the components, the pivotal or effectively pivotal type of buckle or fitting will more effectively accommodate itself to these variable conditions.

It will further be understood that, especially in different types of crashes, the resultant impact load, or succession of loads, can vary between wide directional limits. This sets up extremes of individual webbing strap loading, which can and almost always will vary substantially between individual webbing strap portions, because of the instant impact resultant direction and because of body frictional effects on the webbing.

The result of these factors under high acceleration loads will be to substantially stretch one webbing strap portion more than another, with consequent unpredictable distortion of the originally assembled geometrical pattern of the device. Here again it will be obvious that the pivotal type of common attachment fitting would be preferable from the standpoint of achieving a higher resultant load factor, by minimizing potential edge loading of the webbing of one or more straps.

In manufacturing the device for use in the given installations, the basic structure will comprise the strap 17 having the common fitting 24 slidable thereon, and provided with the terminal connector fittings conventional in the art for attachment to anchor points, and the short strap 30, with its conventional terminal connector fittings. Usually, but not essentially with these, or auxiliary to these, may go the anchorage fittings, for mounting on the seat or for attachment to the primary structure as has been described. As in many cases the installations will be as replacement for older forms of restraint devices, the essential combination of long and short straps and the common fitting will be provided. These are suitably mounted so that the free ends of the strap 17 will be anchored at the effective points 14 and 16, toward one side of the seat, and the short strap will be anchored at its effective point 15 toward the other side of the seat.

Prior to operative restraining assembly, the short strap 30 will be detached from the common fitting so that the occupant can sit upon the seat with the strap 17 on his one side and strap 30 on his other side, without sitting upon either. As at this time the full length of strap 17 between the anchorages thereof is loose and lying generally beside the seat and the back thereof, the occupant places himself on the seat, and then simply pulls the generally loose strap 17 by its common fitting over one arm and shoulder and across his waist, thus establishing courses 20 and 21, and inserts the free end of the short strap 30 through the threading opening of the quick release buckle and tightens the short strap. This simultaneously pulls the shoulder course 21 diagonally downwardly from his shoulder across his torso, while pulling the lap course 20 into relative general alignment with the short strap 30 across his lap. When the quick release buckle is fastened, as by movement of the cam clamping element 26′ against the short strap, the operative assembly is completed. In the preferred organization the shoulder course 21 forms an angle "V" with the lap course 20, which varies with the distance the common fitting moves across the torso of the occupant, which in turn is ultimately controlled by length adjustment fitting 22, but, in any case, the angle is such as to include the general center of gravity of the occupant indicated in Fig. 1 at C. G. In the usual operative assemblies, angle "V" is an acute angle. The single shoulder course 21, while giving the occupant an unexpected sense of freedom of restraint and giving full range of movements necessary for controlling the aircraft, for instance, is adequate for effective restraint of the upper torso and head of the user in the event of accidents, because of the disposition of the shoulder and lap courses relative to the center of gravity of the wearer. Restrained forward movements of the user are permitted by pressure against the shoulder course 21, owing to the freedom of adjustment by the common fitting, as such motions are temporarily provided by a corresponding tightening of the lap course 20. When the user settles back after such restrained movement, the fold or loop 19 adjusts itself on the common fitting to restore the average tightening of both lap and shoulder courses.

It will be seen that it is not necessary for the occupant or user to struggle to place his head or both shoulders through harness, as with the disposition shown the simple operation of drawing the loose strap 17 over the single arm and shoulder is enough. As noted, this is facilitated by the combined lengths of the shoulder course 21 and lap course 20 when the strap 17 is permitted to form a continuous length of strap with reference to the seat and occupant.

Finally, and of great importance, it will be seen that with the device illustrated, all discretion is effectively removed from the occupant, as he cannot conveniently or practically attach and fasten the lap or seat belt portion of the device without as a necessary concomitant, fastening the shoulder strap or course as well.

It will be readily apparent to those skilled in the art that the instant invention provides either superior protection to many of the prior art devices, or in any case, substantially equivalent protection to the best of those heretofore proposed or used, by means of a simplified, convenient, practical structure of appreciably lower cost, which demonstratably teaches that all of the prior art involves either redundancy of structure on the one hand, or inadequacy of protection on the other, or both.

The simplicity and utility of the invention for the intended purpose, as well as its several other multiple advantages will be apparent.

Having thus described our invention, we claim:

1. A combination safety belt comprising shoulder and lap elements having effective continuity through a common intersection, means for anchoring said elements and said intersection so as respectively to dispose said shoulder element diagonally across the chest and over one shoulder and said lap element transversely across the lap and said intersection toward the opposite side from that of said shoulder, to establish a tensional operative organization of said safety belt.

2. A safety belt as recited in claim 1, in which said elements are integral.

3. A safety belt as recited in claim 1 operatively associated with a seat including a back, said means being respectively effective in restraint for said intersection toward the side of said seat opposite to said shoulder and for said lap element on the other side of said seat and for said shoulder element adjacent to the top of the back of said seat.

4. A safety belt as recited in claim 1, in which the means for anchoring said intersection includes a common shoulder-lap element complemental to both said shoulder and lap elements.

5. A safety belt as recited in claim 1, in which the means for anchoring said intersection comprises quick release means with retention of said effective continuity irrespective of operation of said release means.

6. A safety belt as recited in claim 1, in which said elements are integral and the means for anchoring said intersection comprises quick release means slidably mounted on said integral elements to form and locate said common intersection.

7. A safety belt as recited in claim 1, and adjustable means for selectively varying the tension of said operative organization.

8. A combination shoulder and lap safety belt, comprising a plurality of mutually spaced effective anchorage means, a relatively long effectively continuous webbing strap portion engaged and defined in its operative length by two of said plurality of effective anchorage means, a relatively short webbing strap portion engaged and defined in its operative length by another of said plurality of effective anchorage means, means for connecting the relatively short strap to said relatively long strap to divide the latter into a shoulder strap element and a lower seat strap element in acutely angular divergence.

References Cited in the file of this patent

UNITED STATES PATENTS

| Number | Name | Date |
|---|---|---|
| 287,818 | Freeman | Nov. 5, 1883 |
| 726,842 | Bauer | May 5, 1903 |
| 1,895,222 | Johnson | Jan. 24, 1933 |
| 1,971,264 | Irwin | Aug. 21, 1934 |
| 2,195,334 | Lethern | Mar. 26, 1940 |
| 2,275,450 | Manson | Mar. 10, 1942 |
| 2,312,946 | Watter | Mar. 2, 1943 |
| 2,365,625 | Carlisle | Dec. 19, 1944 |
| 2,365,626 | Carlisle | Dec. 19, 1944 |
| 2,372,558 | Dowd | Mar. 27, 1945 |
| 2,394,523 | Pancoe | Feb. 5, 1946 |
| 2,403,653 | Geohegan et al. | July 9, 1946 |
| 2,576,867 | Wilson | Nov. 27, 1951 |